United States Patent
Mu (10) Patent No.: US 10,502,581 B2
(45) Date of Patent: Dec. 10, 2019

(54) INTELLIGENT HEAD-MOUNTED APPARATUS AND CONTROL METHOD THEREOF

(71) Applicant: BOE Technology Group Co., Ltd., Beijing (CN)

(72) Inventor: Xinxin Mu, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 187 days.

(21) Appl. No.: 15/541,136

(22) PCT Filed: Nov. 8, 2016

(86) PCT No.: PCT/CN2016/104969
§ 371 (c)(1),
(2) Date: Jun. 30, 2017

(87) PCT Pub. No.: WO2017/128801
PCT Pub. Date: Aug. 3, 2017

(65) Prior Publication Data
US 2018/0106635 A1    Apr. 19, 2018

(30) Foreign Application Priority Data
Jan. 26, 2016   (CN) .......................... 2016 1 0051880

(51) Int. Cl.
*G01C 21/36*   (2006.01)
*B62J 6/00*    (2006.01)
*A42B 3/04*    (2006.01)

(52) U.S. Cl.
CPC .......... *G01C 21/3652* (2013.01); *A42B 3/042* (2013.01); *A42B 3/0433* (2013.01);
(Continued)

(58) Field of Classification Search
CPC ............ G01C 21/3652; G01C 21/3629; G01C 21/3602; A42B 3/0433; A42B 3/042; A42B 3/0453; B62J 6/005; B62J 2006/006
(Continued)

(56) References Cited

U.S. PATENT DOCUMENTS

| 2011/0268300 A1 | 11/2011 | DeMers et al. |
| 2014/0142851 A1 | 5/2014 | Larmo et al. |
| 2015/0130945 A1 | 5/2015 | Yu et al. |

FOREIGN PATENT DOCUMENTS

| CN | 101884439 | * | 7/2012 |
| CN | 203399732 | * | 1/2014 |

(Continued)

OTHER PUBLICATIONS

Jan. 2, 2018—(CN) First Office Action Appn 201610051880.4 with English Tran.
(Continued)

*Primary Examiner* — Muhammad Shafi
(74) *Attorney, Agent, or Firm* — Banner & Witcoff, Ltd.

(57) ABSTRACT

An intelligent head-mounted apparatus, including: a head-mounted apparatus body; a communication element operable to receive navigation signals and a locating element operable to determine location information, both of which are disposed on the head-mounted apparatus body; and a controller disposed on the helmet apparatus body and operable to control at least one vibrating element based on the navigation signals and the location information; vibrating elements operable to vibrate under the control of the controller. The user of this apparatus can learn navigation information only by perceiving the vibration without being distracted by observing the navigation information, so that the safety of receiving navigation information during riding (Continued)

is improved. A control method of the intelligent head-mounted apparatus is further provided.

17 Claims, 4 Drawing Sheets

(52) U.S. Cl.
CPC .............. *A42B 3/0453* (2013.01); *B62J 6/005* (2013.01); *G01C 21/3602* (2013.01); *G01C 21/3629* (2013.01); *B62J 2006/006* (2013.01)

(58) Field of Classification Search
USPC .......................................................... 701/36
See application file for complete search history.

(56) References Cited

FOREIGN PATENT DOCUMENTS

| | | |
|---|---|---|
| CN | 203399732 U | 1/2014 |
| CN | 103892503 A | 7/2014 |
| CN | 104613959 A | 5/2015 |
| CN | 104621832 A | 5/2015 |
| CN | 104781635 A | 7/2015 |
| CN | 104814560 A | 8/2015 |
| CN | 105139643 | * 12/2015 |
| CN | 105139643 A | 12/2015 |
| CN | 204969670 U | 1/2016 |
| CN | 105547318 A | 5/2016 |
| CN | 205352412 U | 6/2016 |
| JP | 2007031875 A | 2/2007 |
| WO | 2012038577 A1 | 3/2012 |

OTHER PUBLICATIONS

Feb. 7, 2017—(WO) International Search Report and Written Opinion Appn PCT/CN2016/104969 with English Tran.

* cited by examiner

INTELLIGENT HEAD-MOUNTED APPARATUS AND CONTROL METHOD THEREOF

The application is a U.S. National Phase Entry of International Application No. PCT/CN2016/104969 filed on Nov. 8, 2016, designating the United States of America and claiming priority to Chinese Patent Application No. 201610051880.4 filed on Jan. 26, 2016. The present application claims priority to and the benefit of the above-identified applications and the above-identified applications are incorporated by reference herein in their entirety.

TECHNICAL FIELD

The present disclosure relates to an intelligent head-mounted apparatus and a control method thereof.

BACKGROUND

The existing navigation devices are disposed mainly in motor vehicles, such as, automobiles, trains or the like, and rarely in apparatuses related to bicycles. However, navigation is also needed for bicycles in long-distance riding. Among the existing technical solutions to navigation for bicycles, one is to send navigation information to a bicycle and project the navigation information ahead of the bicycle by an illuminating lamp disposed on the front end of bicycle, and another is to dispose a display device on a bicycle that receives and displays navigation information.

In both of the above-mentioned solutions, although navigation for bicycles can be achieved, the riders are distracted by viewing navigation information, easily leading to traffic accidents; it is even more inconvenient to use navigation in such ways when a plurality of riders are riding as a team.

SUMMARY

According to at least one embodiment of this disclosure, an intelligent head-mounted apparatus is provided, comprising: a head-mounted apparatus body; a communication element operable to receive navigation signals and a locating element operable to determine location information, both of which are disposed on the head-mounted apparatus body; and a controller disposed on the helmet apparatus body and operable to control at least one vibrating element based on the navigation signals and the location information; vibrating elements operable to vibrate under the control of the controller.

For example, the vibrating elements comprise a plurality of vibrating elements disposed on the head-mounted apparatus body, each of which is connected to the controller and controlled by the controller to vibrate.

For example, the plurality of vibrating elements comprise a first vibrating element and a second vibrating element; the first vibrating element is disposed on the inner wall of the head-mounted apparatus body on the left side to prompt the user to turn left, and the second vibrating element is disposed on the inner wall of the head-mounted apparatus body on the right side to prompt the user to turn right.

For example, the apparatus further comprises: at least one prompting element disposed on the outer wall of the head-mounted apparatus body, wherein each prompting element is connected to the controller and controlled by the controller to prompt information.

For example, the at least one prompting element is in one-to-one correspondence with the vibrating elements and disposed at different locations on the outer wall of the head-mounted apparatus body; each prompting element is connected with the vibrating element it corresponds to and presents prompting information when the corresponding vibrating element vibrates.

For example, further comprising: an acceleration sensor disposed on the head-mounted apparatus body and connected with the controller, wherein the at least one prompting element corresponds to the acceleration sensor and the acceleration sensor is used to detect and send acceleration information to the controller, so that the controller controls the prompting element corresponding to the acceleration sensor to present prompting information based on the acceleration information.

For example, the prompting element is a signal lamp.

For example, the at least one prompting element comprise a first signal lamp that is disposed on the outer wall of the head-mounted apparatus body on the left side and corresponds to the first vibrating element and a second signal lamp that is disposed on the outer wall of the head-mounted apparatus body on the right side and corresponds to the second vibrating element.

For example, the prompting element further comprise a third signal lamp disposed on the outer wall of the head-mounted apparatus body on the posterior side.

For example, the first signal lamp may emit light of the same color as that of the light emitted by the second signal lamp, and the third signal lamp may emit light of a color different from that of the light emitted by the first and second signal lamps.

For example, the first and second signal lamps have arrow-shaped luminous surfaces respectively.

For example, the at least one prompting element comprise a first column of signal lamps disposed on the outer wall of the head-mounted apparatus body on the left side and a second column of signal lamps disposed on the outer wall on the right side.

For example, further comprising an image acquiring element connected with the controller.

For example, the image acquiring element is disposed on the outer wall of the head-mounted apparatus body on the anterior side and used to acquire prompting information presented by other intelligent head-mounted apparatuses ahead and provide the prompting information to the controller, so that the controller, according to the prompting information, controls the vibrating elements to vibrate and the prompting element to present prompting information.

For example, further comprising an audio element disposed in the head-mounted apparatus body and connected with the controller.

For example, the apparatus may be a head ring, a head band or a helmet.

For example, further comprises: a memory used to store the navigation information that can be accessed by the controller.

According to at least one embodiment of this disclosure, a control method for an intelligent head-mounted apparatus is provided, comprising: acquiring navigation information and real-time location information of the current rider; determining travel information for the next preset period of time for the rider based on the navigation information and the real-time location information; and controlling the vibrating elements on the rider's helmet corresponding to the travel information to vibrate based on the travel information, so that the rider is prompted to travel according to the travel direction information.

For example, the travel information comprises at least travel direction information, controlling the vibrating elements on the rider's helmet corresponding to the travel information to vibrate based on the travel information comprises: controlling the vibrating elements on the rider's helmet corresponding to the travel direction to vibrate based on the travel direction information.

For example, further comprises: controlling the prompting elements on the rider's helmet in one-to-one correspondence with the vibrating elements to present prompting information based on the travel information.

For example, further comprises: acquiring prompting information presented by other intelligent head-mounted apparatuses ahead; and based on the prompting information, controlling the vibrating elements to vibrate and the prompting elements to present prompting information.

For example, further comprises: controlling the prompting element corresponding to an acceleration sensor to present prompting information based on the acceleration information detected by the acceleration sensor.

BRIEF DESCRIPTION OF DRAWINGS

Features and advantages of the present disclosure will be clearly understood with reference to accompanying figures, which are illustrative and should not be considered to limit the present disclosure in any way. In the accompanying figures.

DETAILED DESCRIPTION

In order to make the features, characters and advantages of the disclosure apparent, the technical solutions of the embodiments will be described in a clearly and fully understandable way in connection with the drawings related to the embodiments of the disclosure. It should be noted that, without conflict, embodiments of the present disclosure and features in the embodiments can be combined with each other.

Specific detail of this disclosure is stated in the following description so that this disclosure can be fully understood, however, this disclosure also can be implemented with other means which are different from the description here, hence, the protection scope of this disclosure is not limited in the following embodiments.

Figure 1:
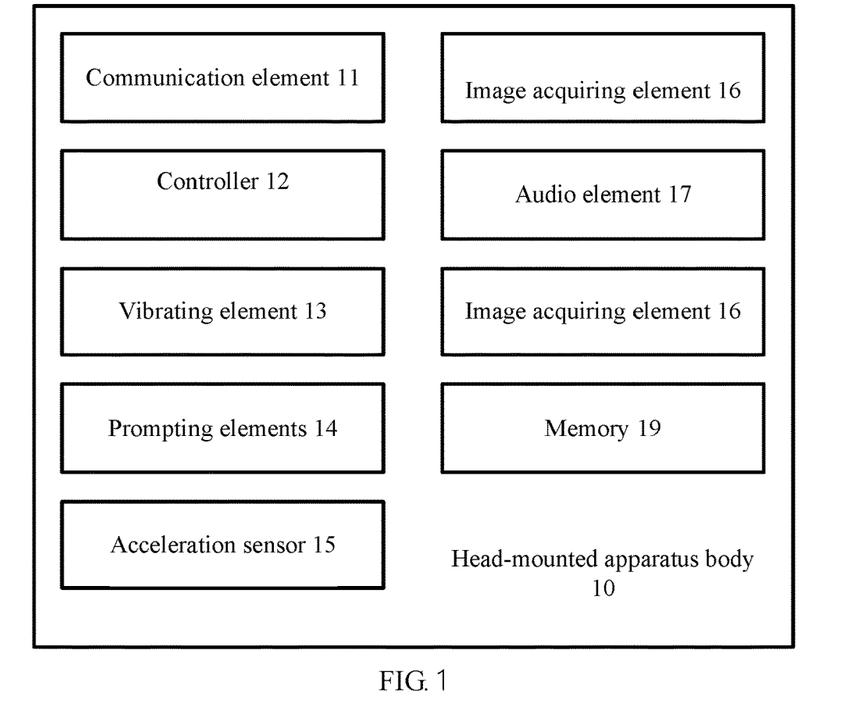
FIG. 1 shows a schematic block diagram of an intelligent head-mounted apparatus according to an embodiment of the present disclosure.

As shown in FIG. 1, an intelligent head-mounted apparatus according to an embodiment of the present disclosure, which may be a head ring, a head band, a helmet or the like and will be described mainly as a helmet in the following embodiments, includes: a head-mounted apparatus body 10; a communication element 11 (e.g. an antenna, a USB interface or a wireless communication interface) operable to receive navigation signals and a locating element 18 (e.g. a GPS locator) operable to determine location information, both of which are disposed on the head-mounted apparatus body 10; a controller 12 disposed on the helmet body 10 to control vibration of at least one vibrating element 13 based on the navigation signals and the location information; and vibrating elements 13 disposed on the head-mounted apparatus body 10 and connected with the controller 12 to be controlled by the controller 12 to vibrate. For example, there may be a plurality of vibrating elements 13, each of which may vibrate under the control by the controller 12. For example, the controller may be a micro-processor or a chipset.

In the present embodiment, different navigation information may be conveyed to the user by vibration of different vibrating elements. For example, when the controller determines that a left-handed turn should be made at the road junction ahead based on the navigation information and the positional information, it sends a vibration driving signal to the vibrating elements on the inner wall on the left side to make them vibrate. Since the apparatus is head-mounted, the user can learn navigation information only by perceiving the vibration without being distracted by observing the navigation information, so that the safety of receiving navigation information during riding is improved. Of course, the user may also turn on or turn off one or more of the vibrating elements as desired.

Each of the vibrating elements may consist of a micro-motor and a cam (also known as an eccentric wheel, a centrifugal wheel, a vibrating terminal or a balance wheel). Since the center of gravity of the cam is not located on the rotating shaft of the motor, when the motor rotates after receiving a vibration driving signal, the cam performs circular motion, which results in a centrifugal force with its direction changing with the rotation of the cam, bringing about a sense of vibration. Furthermore, the motor may be wrapped by a rubber sleeve for vibration damping and fixation assistance so as to reduce damage to the head-mounted apparatus body or the human body when vibrating.

It is to be noted that the navigation mode described above may be off line, i.e. navigation signals (e.g. electronic maps and travel routes) may be pre-stored in a memory module of the intelligent head-mounted apparatus without having to receive navigation information from the network side in real time. In this way, one only needs to achieve location by himself to determine his position in the pre-stored travel route as well as information about the following travel direction or the like, so that the vibrating elements are controlled to vibrate according to the information about travel direction or the like.

Of course, the present embodiment may also be implemented on line, i.e. the intelligent head-mounted apparatus locates itself and uploads the location information to the network side, for example, to an intelligent mobile phone or a navigation server. The network side determines information about the following travel direction (e.g. a left-handed turn or a right-handed turn) or the like for the rider based on the location information and the rider's travel route and sends the information about travel direction or the like to the intelligent head-mounted apparatus, so that the controller may control the vibrating elements (e.g. the vibrating elements disposed on the head-mounted apparatus body on the left side or the right side) to vibrate based on the information.

If a rider needs to be prompted to turn left or turn right by the intelligent head-mounted apparatus, there should be at least two vibrating elements to be disposed on the intelligent head-mounted apparatus and the following description will be given in the case of two vibrating elements.

Figure 2:
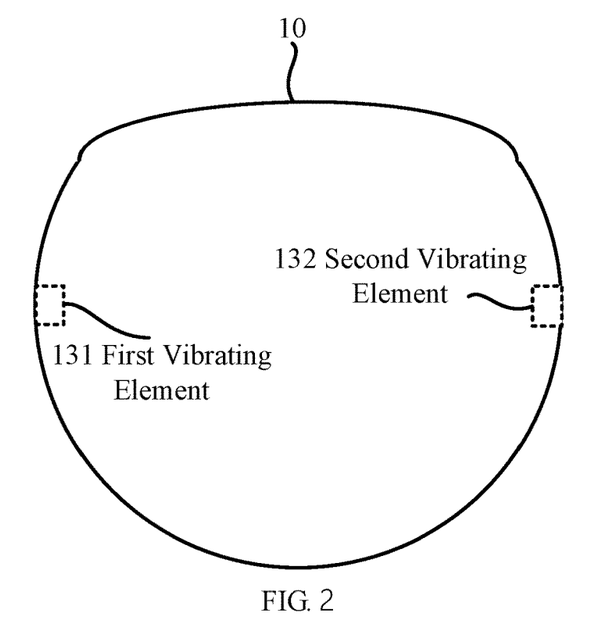
FIG. 2 shows a top view of an intelligent head-mounted apparatus according to an embodiment of the present disclosure.

As shown in FIG. 2, for example, the plurality of vibrating elements 13 includes a first vibrating element 131 to prompt a left-handed turn and a second vibrating element 132 to prompt a right-handed turn. The first vibrating element 131 is disposed on the inner wall of the head-mounted apparatus body 10 on the left side to prompt the user to turn left and the second vibrating element 132 is disposed on the inner wall of the head-mounted apparatus body 10 on the right side to prompt the user to turn right.

According to the present embodiment, the position of the first vibrating element 131 on the head-mounted apparatus body 10 is corresponding to the received navigation signal for which it is vibrating, and the position of the second vibrating element 132 on the head-mounted apparatus body 10 is corresponding to the received navigation signal for which it is vibrating, so that as soon as the user perceives vibration of a vibrating element he or she can determine that the navigation information indicates the direction in which the vibrating element is located. Since on the one hand the necessity of viewing navigation information through eyes is eliminated and on the other hand the process of analyzing the navigation information through brains is reduced, the degree of convenience and safety for perception of navigation information is improved.

Of course, in the present application, the above-mentioned vibrating elements may be substituted by an audio component or optical components. Alternatively, an audio component (e.g. a speaker) is additionally disposed, and the controller controls the audio component to output prompting information (e.g. "turn left ahead") while controlling a vibrating element to vibrate.

The above-mentioned vibrating elements are used to prompt the rider himself how to advance and, in order to communicate the rider's travel direction to his riding teammates or other passersby, in an example of the present disclosure, the intelligent head-mounted apparatus further includes a prompting element 14 connected with the controller 12 to prompt information under the control by the controller.

Moreover, there may also be a plurality of prompting elements 14, which are disposed at different positions on the outer wall of the head-mounted apparatus body 10 in one-to-one correspondence with the plurality of vibrating elements 13 and used to prompt the persons, who can see the signals from the prompting elements, to ride with the rider's riding direction as a reference. Each of the prompting elements 14 is connected to the controller 12 and/or a corresponding vibrating element 13 and may provide prompting information when its corresponding vibrating element 13 is vibrating.

Since the prompting elements 14 are disposed on the outer wall, prompting information may be conveniently conveyed to the riders behind. For example, when the navigation information indicates a left-handed turn at the road junction ahead, the prompting element, for example, a signal lamp, disposed on the outer wall on the left side begins to illuminate, so that the riding teammates behind may conveniently learn the navigation information by catching a sight of the prompting element on the apparatus.

Moreover, since the prompting elements are disposed on the head-mounted apparatus of a rider, the following teammates can learn navigation information only by taking notice of the helmets of the preceding riding teammates in the riding direction without having to be distracted by viewing navigation information in another direction, improving the degree of riding safety. Of course, the user may also turn on or turn off one or more of the prompting elements as desired.

According to an embodiment of the present disclosure, the intelligent head-mounted apparatus described above may further include an acceleration sensor 15 that is disposed on the head-mounted apparatus body 10 and connected with the controller 12. Among the prompting elements 14, there may be one prompting element corresponding to the acceleration sensor. The acceleration sensor 15 is used to detect and send acceleration information to the controller, so that the controller 12 may control the prompting element corresponding to the acceleration sensor to present prompting information according to the acceleration information.

With the prompting elements in the present embodiment, the following riders may be informed of both the navigation information and the acceleration information (e.g. the speed-down information) of the preceding riders, so that the preceding riders are slowing down, they may be protected from being crashed from behind by the following bicycles.

Figure 3:
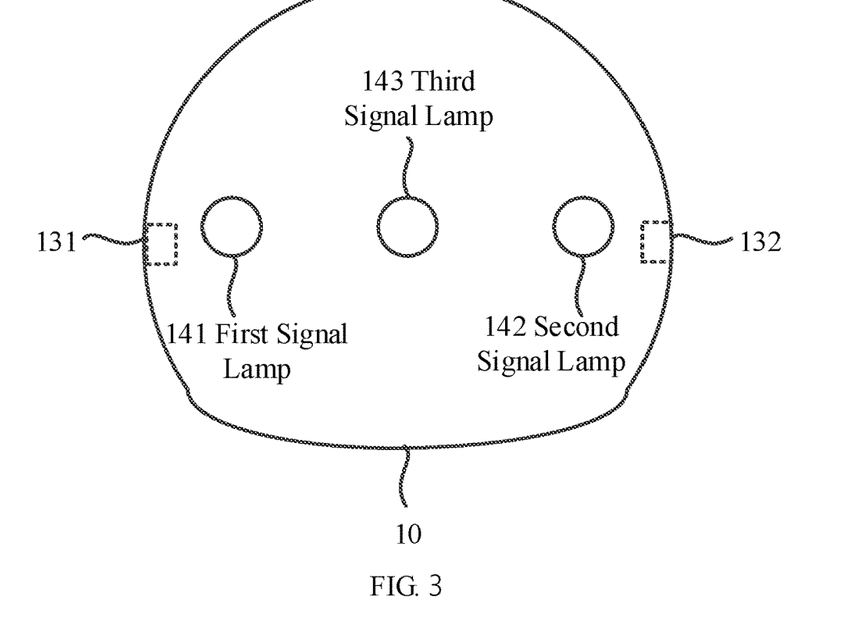
FIG. 3 shows a front view of an intelligent head-mounted apparatus according to an embodiment of the present disclosure.

As shown in FIG. 3, for example, the prompting elements 14 are signal lamps, which have simple structures and are easy to dispose.

For example, the plurality of prompting elements 14 include a first signal lamp 141 that is disposed on the outer wall of the head-mounted apparatus body 10 on the left side and corresponds to the first vibrating element 131 and a second signal lamp 142 that is disposed on the outer wall of the head-mounted apparatus body 10 on the right side and corresponds to the second vibrating element 142. Of course, in order to make the following riders better informed, a third signal lamp 143 may further be disposed on the outer wall of the head-mounted apparatus body 10 on the posterior side.

The controller 12 sends a driving signal for the prompt of a left-handed turn to the first signal lamp 141 when an analysis result of a left-handed turn is obtained, sends a driving signal for the prompt of a right-handed turn to the second signal lamp 142 when an analysis result of a right-handed turn is obtained and sends a driving signal for the prompt of speed-down to the third signal lamp 143 when a negative acceleration is detected.

According to the present embodiment, the first signal lamp is at the position on the head-mounted apparatus body corresponding to the received navigation signal for which it illuminates and the second signal lamp is at the position on the head-mounted apparatus body corresponding to the received navigation signal for which it illuminates, so that if the persons behind perceive that a signal lamp is illuminating, they may determine that the navigation information indicates the direction in which the signal lamp is located. Since on the one hand the necessity of viewing navigation information in a direction other than the traveling direction is eliminated and on the other hand the process of analyzing the navigation information through brains is reduced, the degree of convenience and safety for perception of navigation information by persons behind is improved.

For example, the first signal lamp 141 and the second signal lamp 142 may emit light of the same color while the third signal lamp 143 may emit light of a color different from that of the light from the first signal lamp 141 and the second signal lamp 142. The first signal lamp 141 may also emit light of a color different from that of the light emitted by the second signal lamp 142 to facilitate distinguishing between the navigation information for a left-handed turn, the navigation information for a right-handed turn and the speed-down information by persons behind.

The light of a first color may be green or yellow light that has the same color as the corresponding traffic indictor light and the light of a second color may be red light that has the same color as the corresponding traffic alarm light, so that the riders behind may determine the content of the prompt based on the colors and react thereto more quickly.

Figure 4:
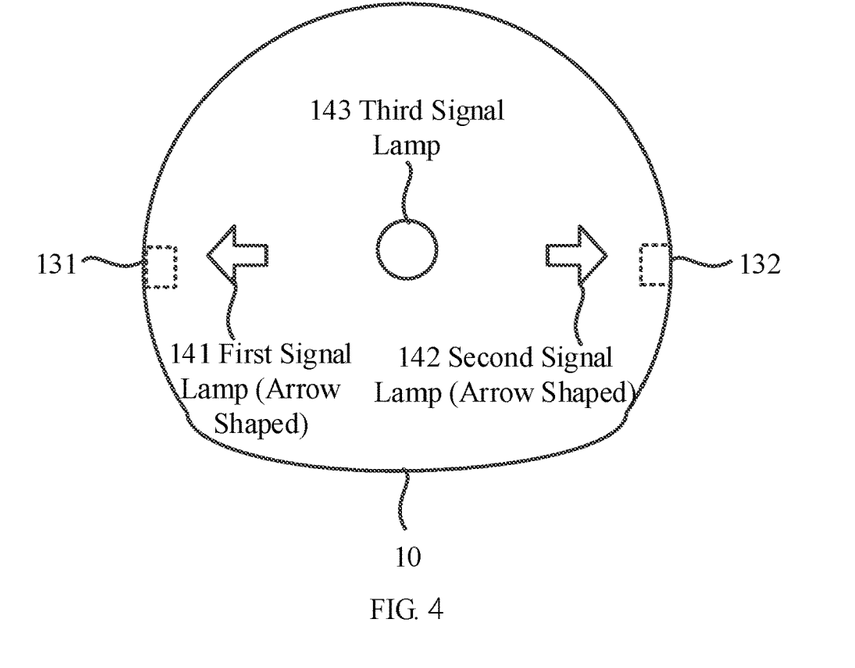
FIG. 4 shows a front view of an intelligent head-mounted apparatus according to another embodiment of the present disclosure.

As shown in FIG. 4, the luminous surfaces of the first signal lamp 141 and the second signal lamp 142 may be arrow-shaped. A signal lamp of an arrow shape is easy to recognize so as to facilitate quick recognition of the signal lamp by riders behind.

Figure 5:
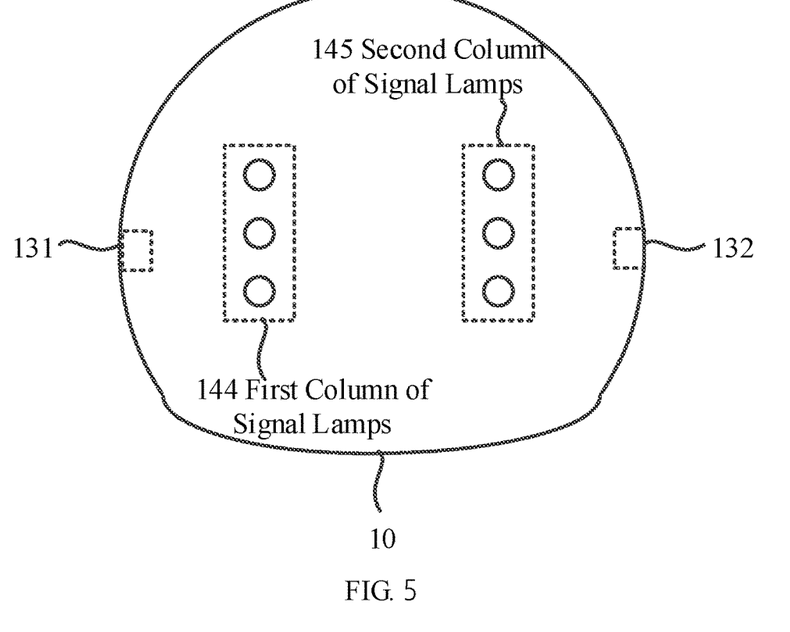
FIG. 5 shows a front view of an intelligent head-mounted apparatus according to yet another embodiment of the present disclosure.

As shown in FIG. 5, in an example of the present disclosure, the plurality of prompting elements 13 may further include a first column of signal lamps 144 disposed on the outer wall of the head-mounted apparatus body 10 on the left side and a second column of signal lamps 145 disposed on the outer wall on the right side.

If the controller 12 determines that a left-handed turn needs to be done at the road junction ahead based on the navigation information and the location information, it controls the first column of signal lamps 144 to turn on; if the controller 12 determines that a right-handed turn needs to be done at the road junction ahead, it controls the second column of signal lamps 145 to turn on; if a negative acceleration is detected, the first column of signal lamps 144 and the second column of signal lamps 145 are controlled to turn on simultaneously.

By using two columns of signal lamps to display the navigation information for a left-handed turn, the navigation information for a right-handed turn and the speed-down information, the display becomes more noticeable and is easier to be recognize.

Figure 6:
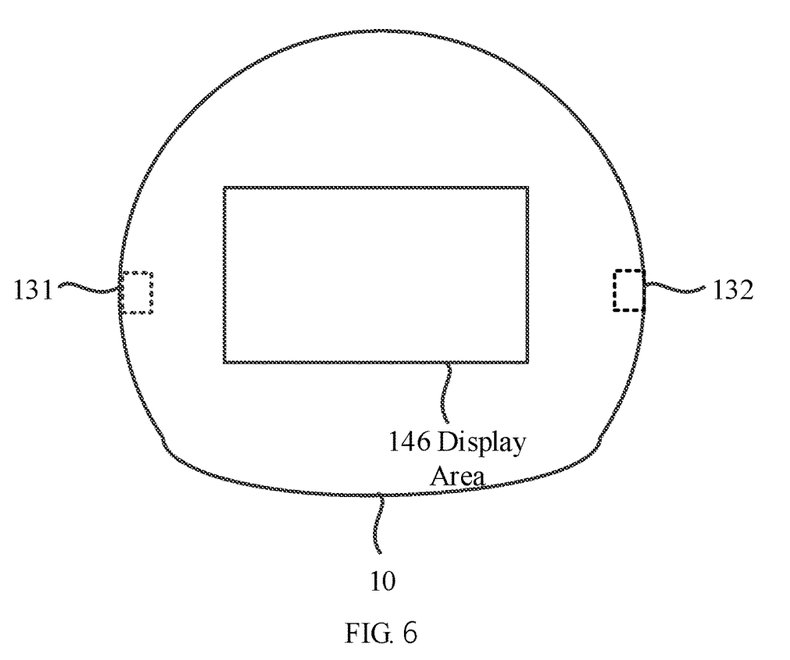
FIG. 6 shows a front view of an intelligent head-mounted apparatus according to yet another embodiment of the present disclosure.

As shown in FIG. 6, for example, the plurality of prompting elements 13 are a plurality of pixel units that form a display area 146. If the controller 12 determines that a left-handed turn needs to be done at the road junction ahead based on the navigation information and the location information, it controls the display area 146 to display a sign for a left-handed turn; if the controller 12 determines that a right-handed turn needs to be done at the road junction ahead, it controls the display area 146 to display a sign for a right-handed turn; if a negative acceleration is detected, the display area 146 is controlled to display a sign for speed-down.

The display area may display relatively complex patterns conveniently to convey more kinds of navigation information to the riders behind without being limited to the information of a left-handed turn, a right-handed turn and speed-down.

For example, the sign for a left-handed turn is an arrow pointing to the left, the sign for a right-handed turn is an arrow pointing to the right, and the sign for speed-down is the whole display area emitting red light. The navigation information displayed in this way is easy to recognize, so that the riders behind may recognize the navigation information at a higher speed. In addition to the signs for a left-handed turn, a right-handed turn and speed-down, the display area may also display other navigation information. For example, if there is a railway ahead, the display area may display a railway sign, or if there is a sharp turn ahead, it may display a sharp-turn sign. The signs described above include graphics and/or text.

Figure 7:
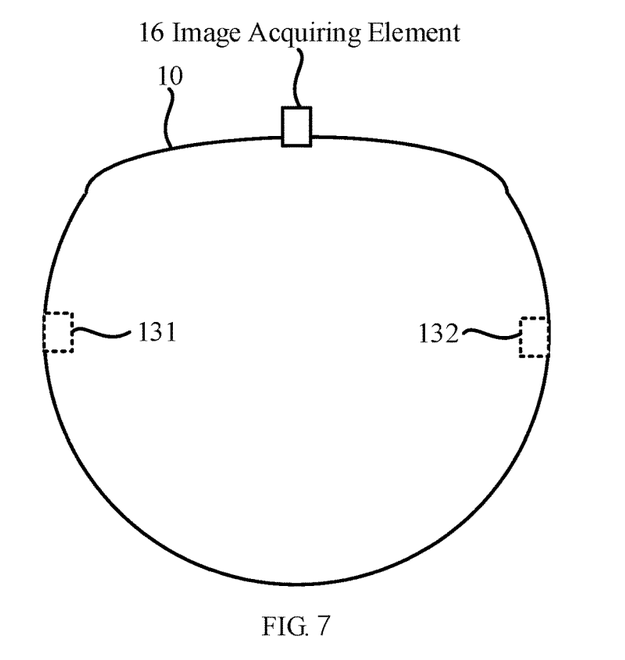
FIG. 7 shows a top view of an intelligent head-mounted apparatus according to yet another embodiment of the present disclosure.

As shown in FIG. 7, for example, the intelligent head-mounted apparatus described above may further include an image acquiring element 16 (e.g. a camera) disposed on the outer wall of the head-mounted apparatus body 10 on the anterior side and connected to the controller 12. The image acquiring element is used to acquire prompting information provided by other intelligent head-mounted apparatuses ahead and sends the prompting information to the controller 12, which, according to the prompting information, controls the vibrating elements 13 to vibrate and controls the prompting elements 14 to present prompting information.

According to the acquired prompting information, at least one of the vibrating elements 13 vibrate and the prompting elements 14 present corresponding prompting information.

In the present embodiment, prompting information presented by intelligent head-mounted apparatuses ahead may be acquired and used to control the prompting elements to present corresponding prompting information. When a plurality of riders are riding in company, it is only necessary for the intelligent head-mounted apparatus of the leading rider to receive navigation information, and intelligent head-mounted apparatuses of other teammates may present prompting information to their wearers and/or the following riders according to the prompting information presented by the intelligent head-mounted apparatuses of the preceding teammates.

According to an embodiment of the present disclosure, the intelligent head-mounted apparatus described above may further include an audio element 17 (e.g. an earphone) disposed in the head-mounted apparatus body 10 and connected with the controller 12. The controller is also used to determine the complexity of the navigation information. If the complexity is higher than a preset complexity, the audio element 17 will generate voice prompting information based on the navigation information, or if the complexity is equal to or less than the preset complexity, at least one of the vibrating elements will vibrate according to the driving signal.

In consideration of portability, the prompting elements generally have simple structures and present relatively fewer kinds of navigation information. For example, they can only present information of a left-handed turn or a right-handed turn through vibration. In the present embodiment, audio signals may be generated from the navigation information to provide prompt to the rider, so that more complex navigation information may be conveyed to him.

For example, if the navigation information includes non-turn information, it is determined that the navigation information has a complexity higher than the preset complexity. For example, if the navigation information indicates a sharp turn 800 meters father from here, voice information may be generated for prompt.

For example, the intelligent head-mounted apparatus may be a head ring, a head band or a helmet.

For example, the intelligent head-mounted apparatus further includes a memory 19 used to store navigation information that can be accessed by the controller 12.

Figure 8:
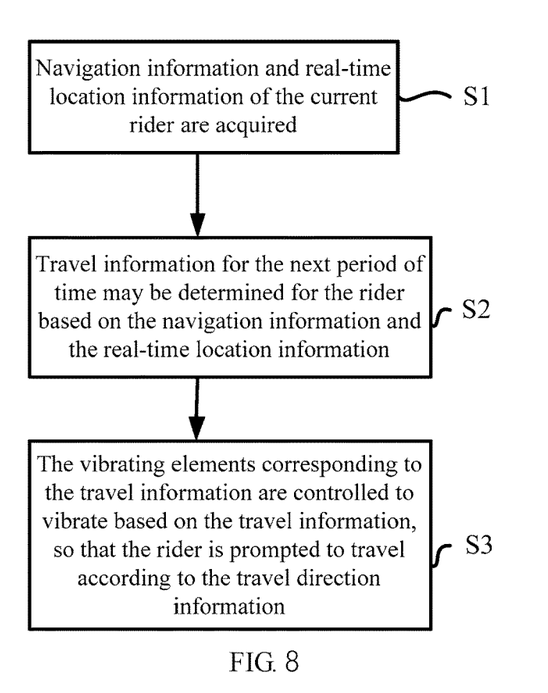
FIG. 8 shows a schematic flowchart of a control method for an intelligent head-mounted apparatus according to yet another embodiment of the present disclosure.

As shown in FIG. 8, the present disclosure further provides a control method for an intelligent head-mounted apparatus. The control method is a method for controlling the intelligent head-mounted apparatus in the embodiment described above and will be briefly described hereafter for brief introduction of the specification. The method includes the following steps.

In step S1, navigation information and real-time location information of the current rider are acquired.

For example, navigation information, such as electronic maps and travel routes of the user, sent from a navigation server may be acquired by a wireless interface on the intelligent head-mounted apparatus, and the real-time location information may be acquired by the locator on the intelligent head-mounted apparatus.

During acquirement of navigation information, the navigation information, such as electronic maps and travel routes of the user, sent by a terminal equipment (e.g. a mobile phone, a mobile computer or the like) may also be received through a USB interface on the intelligent head-mounted apparatus.

In step S2, travel information for the next period of time may be determined for the rider based on the navigation information and the real-time location information.

For example, the travel information indicating, for example, a left-handed turn, a right-handed turn, stop, going straight on or the like at the moment a period of time (e.g. a minute) away from the current moment may be determined based on the trajectory of the travel route and the position on the trajectory indicated by the real-time location information.

For example, if the trajectory of the travel route that is close to the real-time location information turns left, it is determined that a left-handed turn should be done; if the trajectory of the travel route that is close to the real-time location information turns right, it is determined that a right-handed turn should be done; if the trajectory of the travel route that is close to the real-time location information is straight, it is determined that the rider should go straight on; if the real-time location information is determined to have no change in a set period of time, it is determined that the rider should stop.

In step S3, the vibrating elements corresponding to the travel information are controlled to vibrate based on the travel information, so that the rider is prompted to travel according to the travel direction information.

In the example above, if it is determine the rider should turn right, vibration prompting information or voice prompting information may be output. If is determined that the rider should turn right, the vibrating elements disposed on the intelligent head-mounted apparatus on the right side are driven to vibrate while those on the left side will hold still. If the user perceives vibration of the vibrating elements on the right side, he may consider going rightward with reference to the prompting information.

For example, the travel information includes at least travel direction information. According to the travel direction information, the vibrating elements on the rider's helmet corresponding to the travel direction may be controlled to vibrate.

For example, the method above further includes controlling the prompting elements on the rider's helmet in one-to-one correspondence with the vibrating elements to present prompting information based on the travel information.

For example, the method above further includes acquiring prompting information presented by other intelligent head-mounted apparatuses ahead, controlling the vibrating elements to vibrate based on the prompting information and controlling corresponding prompting elements to present prompting information.

For example, the method above further includes controlling the prompting element corresponding to the acceleration sensor to present prompting information according to acceleration information detected by the acceleration sensor.

Technical solutions of the present disclosure have been described in details with reference to accompanying figures. In related technologies, angles for human face imaging or other information are not fully taken into account in image encoding, and in view of this it is difficult to further reduce the information quantity of the encoded image frames and the primary image frames cannot be recovered. According to technical solutions of the present disclosure, different navigation information may be conveyed to the user through vibration of different vibrating elements. For example, if the navigation information indicates a left-handed turn at the road junction ahead, the vibrating element on the inner wall of the apparatus on the left side will vibrate. Since the apparatus is head-mounted, the user can obtain navigation information only by perceiving vibration without having to be distracted by observing the navigation information, so that the safety of receiving navigation information during riding is improved.

In this disclosure, terms such as "first", "second" or "third" are only used to depict an objective, should not be understood as indicating or implying relative importance. And term of "a plurality of" means two or more than two unless with other definite limitation.

What are described above is related to the illustrative embodiments of the disclosure only and not used to limit the disclosure. Obvious variations and replacement belong to this disclosure for any one of the skilled person in the art. Any modification, equal replacement or improvement and the like in the spirit and rules of this disclosure, should be all covered in the scope of this disclosure.

The present application claims priority of China patent application No. 201610051880.4 filed on Jan. 26, 2016, which is incorporated herein in its entirety by reference as a part of the present application.

The invention claimed is:

1. An intelligent head-mounted apparatus comprising:
a head-mounted apparatus body;
a communication element operable to receive navigation signals and a locating element operable to determine location information, both of which are disposed on the head-mounted apparatus body;
a controller disposed on the head-mounted apparatus body and operable to control at least one vibrating element based on the navigation signals and the location information, the at least one vibrating element connected with the controller and operable to vibrate under the control of the controller;
at least one prompting element, being in a one-to-one correspondence with the at least one vibrating element, and
an image acquiring element connected with the controller, wherein the at least one prompting element is connected to the controller and/or the corresponding vibrating element, and presents prompting information when the corresponding vibrating element vibrates, and the at least one prompting element is at least one pixel unit that forms a display area for displaying signs, including graphics and/or text, and
the image acquiring element is disposed on an outer wall of the head-mounted apparatus body on an anterior side and configured to acquire prompting information presented by other intelligent head-mounted apparatuses ahead and provide the acquired prompting information to the controller, to enable the controller, according to the acquired prompting information, to control the at least one vibrating element to vibrate and the at least one prompting element to present the prompting information.

2. The intelligent head-mounted apparatus of claim 1, wherein the at least one vibrating element comprises a plurality of vibrating elements disposed on the head-mounted apparatus body, each of which is connected to the controller and controlled by the controller to vibrate.

3. The intelligent head-mounted apparatus of claim 2, wherein the plurality of vibrating elements comprise a first vibrating element and a second vibrating element;
the first vibrating element is disposed on an inner wall of the head-mounted apparatus body on a left side to prompt a user to turn left; and
the second vibrating element is disposed on the inner wall of the head-mounted apparatus body on a right side to prompt the user to turn right.

4. The intelligent head-mounted apparatus of claim 1, wherein the at least one prompting element is disposed on the outer wall of the head-mounted apparatus body, wherein the at least one prompting element is controlled by the controller to present the prompting information.

5. The intelligent head-mounted apparatus of claim 4, wherein
the at least one prompting element comprises at least two prompting elements disposed at different locations on the outer wall of the head-mounted apparatus body.

6. The intelligent head-mounted apparatus of claim 5, wherein the at least one prompting element comprises a first signal lamp that is disposed on the outer wall of the head-mounted apparatus body on a left side and corresponds to a first vibrating element, and a second signal lamp that is disposed on the outer wall of the head-mounted apparatus body on a right side and corresponds to second vibrating element, wherein the prompting element further comprises a third signal lamp disposed on the outer wall of the head-mounted apparatus body on a posterior side.

7. The intelligent head-mounted apparatus of claim 6, wherein the first signal lamp may emit light of a same color as that of light emitted by the second signal lamp, and the third signal lamp may emit light of a color different from that of the light emitted by the first and second signal lamps.

8. The intelligent head-mounted apparatus of claim 6, wherein the first and second signal lamps have arrow-shaped luminous surfaces.

9. The intelligent head-mounted apparatus of claim 4, further comprising:
an acceleration sensor disposed on the head-mounted apparatus body and connected with the controller, wherein the at least one prompting element corresponds to the acceleration sensor, and the acceleration sensor is used to detect and send acceleration information to the controller, to enable the controller to control the at least one prompting element to present prompting information based on the acceleration information.

10. The intelligent head-mounted apparatus of claim 4, wherein the prompting element is a signal lamp.

11. The intelligent head-mounted apparatus of claim 4, wherein the at least one prompting element comprises a first column of signal lamps disposed on the outer wall of the head-mounted apparatus body on a left side and a second column of signal lamps disposed on the outer wall of the head-mounted apparatus body on a right side.

12. The intelligent head-mounted apparatus of claim 1, further comprising an audio element disposed in the head-mounted apparatus body and connected with the controller.

13. The intelligent head-mounted apparatus of claim 1, wherein the head-mounted apparatus body may be a head ring, a head band, or a helmet.

14. A control method for an intelligent head-mounted apparatus, comprising:
acquiring navigation information and real-time location information of a current rider;
determining travel information for a next preset period of time for the rider based on the navigation information and the real-time location information;
controlling vibrating elements on the rider's helmet to vibrate based on the travel information, so that the rider is prompted to travel according to travel direction information;
acquiring prompting information presented by other intelligent head-mounted apparatuses ahead; and
based on the acquired prompting information, controlling the vibrating elements to vibrate and prompting elements to present prompting information, the prompting elements being on the rider's helmet in one-to-one correspondence with the vibrating elements,
wherein the prompting elements comprise a plurality of pixel units that form display area for displaying signs, including graphics and/or text.

15. The control method of claim 14, wherein the travel information comprises at least the travel direction information, and wherein the controlling the vibrating elements on the rider's helmet to vibrate based on the travel information comprises:
controlling the vibrating elements on the rider's helmet corresponding to a travel direction to vibrate based on the travel direction information.

16. The control method of claim 14, further comprising:
controlling the prompting elements to present the prompting information based on the travel information.

17. The control method of claim 14, further comprising:
controlling a prompting element corresponding to an acceleration sensor to present prompting information based on acceleration information detected by the acceleration sensor.

\* \* \* \* \*